Patented Feb. 13, 1940

2,190,248

UNITED STATES PATENT OFFICE 2,190,248

PROCESS FOR OBTAINING A SUBSTANCE LOWERING THE BLOOD PRESSURE

Ernst Wollheim, Berlin-Charlottenburg, Germany

No Drawing. Application November 18, 1936, Serial No. 111,557. In Germany November 21, 1935

10 Claims. (Cl. 167—74)

My invention relates to a process for obtaining a substance lowering the blood pressure from human or animal urine. The obtained substance has the special property of being resistant to boiling. Hence, by boiling, it is possible to readily separate it from other active substances or hormones contained in the urine but not resistant to boiling. The boiling consequently to be executed in the preparation of the substance lowering the blood pressure for destroying the accompanying substances not resistant to boiling may be effected as well in an acid as in a neutral medium, but also in a medium having a slightly alkaline reaction.

I have found that the substance lowering the blood pressure may be obtained from the urine most readily and quantitatively, if the urine is treated with water soluble sulphates, preferably with sulphate of ammonia, before or after boiling and neutralizing, but conveniently after the execution of these operations. Other water soluble sulphates, such as sodium sulphate, however, may also be employed for this purpose, though not with quite the same high success.

It has been proven by my prior researches that all normal urine of men or animals, particularly of mammalia, contains considerable quantities of the substance active in lowering the blood pressure and which substances are resistant to boiling, whereas this substance is missing in the urine of individuals sick with high blood pressure. I have also found this active substance present in the urine of pregnant women and animals.

When working up urine of the latter kind there is only the difficulty to be overcome, that the active agent lowering the blood pressure must also be separated from the ovarial hormone contained therein and which also is resistive against boiling. This separation may be executed by applying such methods as for instance extracting with ether, precipitating with alcohol and the like, by which only one of said components will be dissolved or precipitated, respectively. Whereas the ovarial hormone, as is well known, is readily soluble in ether, the active agent lowering the blood pressure, the preparation of which is here in question, essentially is insoluble in ether. Therefore both substances may be separated from a raw material containing both, for instance by first extracting the boiled urine in neutral or acid form with ether, and then treating the part not taken up by the ether in order to separate therefrom the active substance lowering the blood pressure.

For destroying the hormones not resistant to boiling and accompanying the active substance lowering the blood pressure, in the urine, generally it is sufficient to boil once for a relatively short time. But, to make sure, one may boil for some longer time, for instance for five minutes in neutral or acid solution. Preferably said boiling is effected before any other treatment of the urine, in order thus to destroy from the first the undesired substances, thereby facilitating and accelerating the concentration or enrichment of the substance lowering the blood pressure. But, under certain circumstances, one may proceed reversely in first concentrating said substance and then destroying the undesired accompanying substances not resistive against boiling by boiling the resultant concentrated solution. The remaining liquid may then be subjected to a further refinement or purification, if desired. In all cases the urine may be thickened by heating, if desired in a vacuum.

Examples (1) 17 liters of urine are boiled, neutralized and filtered. In this urine 7 kilos of ammonium sulphate are dissolved. (This gives a solution containing about 29% ammonium sulphate.) A fine, rather colourless sediment then separates slowly. The mass is left standing at or below ordinary room temperature during several hours, for instance over night, until the separation is complete, after which it is filtered off. The residue is taken up with 700 cubic centimeters of water, and the formed solution is separated from any remaining residue. From the aqueous solution obtained the active substance is precipitated anew by saturating with sulphate of ammonia. Again a white sediment is formed which, when complete, is filtered off as described above and then is dissolved in water. From the again formed solution the sulphate of ammonia is eliminated by any convenient method, for instance by dialysis or electrodialysis, or the like. This is possible because the active substance lowering the blood pressure is not dialysable.

If 0.5 to 1 cubic centimeter of the obtained solution are injected to a rabbit, the blood pressure of this animal will be lowered very considerably for about thirty minutes to one hour.

(2) The solution obtained according to Example 1 by dissolving in 700 cubic centimeters of water the first precipitate obtained by means of sulphate of ammonia may be purified further by treating said solution with five times its quantity of methanol or four times its quantity of anhydrous acetone. The active substance is precipitated thereby and is freed from the remaining solution by filtration or by centrifuging. The obtained solid product is repeatedly washed with ether and with concentrated or absolute alcohol and is then dissolved again by means of 200 cubic centimeters of water. This solution is freed from impurities, especially from salts yet contained therein, by dialysis or electrodialysis during 24 hours. The remaining solution containing the active substance may be used as such or may be further concentrated in vacuo, if desired. It can be kept for a considerable period without objectionable fermentation, and without loss of activity.

Instead of first treating the urine with sulphate of ammonia and thereafter treating the solution obtained from the first precipitate with methanol or the like, one may also proceed in the reverse order by first treating the boiled urine with methanol or acetone to precipitate a material containing the active substance, dissolving the thus obtained precipitate in water and then precipitating the active substance afresh from this solution by means of sulphate of ammonia.

(3) 15 liters of urine are boiled, neutralized and filtered. Then 8 kilos of sodium sulphate are dissolved in this filtrate. A considerable quantity of sediment slowly separates. The mass is left standing for some hours, preferably over night, at ordinary or reduced temperature until the separation will be completed. The sediment then is filtered off and washed three times with concentrated alcohol and ether. Thereafter it is taken up with 600 cubic centimeters of water and shaken therewith during 4 hours, whereupon the formed solution is separated from any residue remaining. To the solution thus obtained five times its quantity of methanol or four times its quantity of anhydrous acetone is added, and the further treatment is performed in the manner indicated in Example 2.

Having now particularly described and ascertained the nature of my said invention, I declare that what I claim is:

1. A process for obtaining from urine, a substance capable of lowering the blood pressure, which comprises adding a water soluble sulphate to urine, in amount sufficient to produce a precipitate containing the desired substance, allowing the mixture to stand for at least several hours, separating said precipitate from the liquid, therafter dissolving said substance capable of lowering the blood pressure, in water, and at some stage of the process, heating the liquid containing the active substance to about the boiling point.

2. A process of obtaining from urine, a substance capable of lowering the blood pressure, which comprises boiling the urine, and adding thereto ammonium sulphate, thereby forming a precipitate containing the desired substance, and separating said precipitate from the liquid and dissolving the precipitate.

3. A process of obtaining from urine, a substance capable of lowering the blood pressure, which comprises concentrating urine; treating the same with a water soluble sulphate in amount sufficient to cause precipitation of such desired substance, and boiling for a short time, thereby forming a precipitate containing the desired substance, and separating such precipitate from the liquid, dissolving the precipitate and reprecipitating the blood-pressure-lowering substance from such solution.

4. A process of obtaining from urine, a substance capable of lowering the blood pressure, which comprises boiling the urine, and adding a water soluble sulphate in the solid state thereto, thereby forming a precipitate containing the desired substance, and separating such precipitate from the liquid, redissolving such precipitate in water and reprecipitating, whereby the product is purified.

5. A process for obtaining from the urine of a pregnant mammal, a substance capable of lowering the blood pressure, which comprises boiling the said urine for a short time, then extracting the same with ether, and thereafter treating the same with a water soluble sulphate, thereby forming a precipitate containing the desired substance, and separating such precipitate from the liquid and dissolving the precipitate in water.

6. A process for obtaining from urine, a substance capable of lowering the blood pressure, thereafter which comprises boiling the urine, thereafter adding a water soluble sulphate, thereby forming a precipitate containing the desired substance, dissolving such precipitate in water, adding methanol to the so obtained aqueous solution, and thereby reprecipitating the desired substance afresh, in purer condition.

7. A process for obtaining from urine, a substance capable of lowering the blood pressure, which comprises boiling the urine, and adding thereto a water soluble sulphate, thereby forming a precipitate containing the desired substance, redissolving such precipitate in water, and purifying the solution thus obtained by dialysing out constituents other than the said desired substance.

8. A process for obtaining from urine, a substance capable of lowering the blood pressure, which comprises adding to urine a water soluble sulphate in a solid state, and thereby forming a precipitate containing the desired substance, then dissolving such precipitate in water, adding a water soluble sulphate to said aqueous solution, and thereby again precipitating the desired substance in a purer condition and boiling the solution containing the dissolved active substance at any stage of process.

9. A process for obtaining a substance capable of lowering the blood pressure, from urine of a pregnant female mammal, which comprises boiling the urine, extracting the urine with an organic liquid which is immiscible with water and which is a solvent for ovarial hormone, and thereafter treating the urine with ammonium sulphate, whereby a precipitate is formed in the aqueous liquid, and thereafter separating said precipitate which contains the desired substance from the liquid, and redissolving such precipitated substance capable of lowering the blood pressure, in water.

10. A process of producing a substance capable of lowering the blood pressure, which comprises precipitating said substance from urine by adding a sufficient amount of ammonium sulphate to said urine, allowing the same to stand for at least several hours, separating the precipitated material, redissolving the precipitate in water, and reprecipitating said substance, and at some stage of the treatment, subjecting a material containing said substance to a temperature equal to the boiling point of urine, to decompose material present therewith which is unstable at such temperatures.

ERNST WOLLHEIM.